Figure 1:
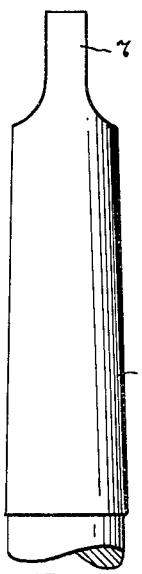

Sept. 26, 1933.    T. F. GITHENS    1,928,014

REAMER

Filed Sept. 18, 1931

INVENTOR.
Thomas F. Githens
BY
Fay, Oberlin & Fay
ATTORNEYS.

Patented Sept. 26, 1933

1,928,014

UNITED STATES PATENT OFFICE 1,928,014

REAMER

Thomas F. Githens, Cleveland Heights, Ohio, assignor to The Cleveland Twist Drill Company, Cleveland, Ohio, a corporation of Ohio Application September 18, 1931
Serial No. 563,556

1 Claim. (Cl. 77—75.5)

This invention relates to reamers, particularly those of the expansion type.

In the construction of reamers which are to be used for the general purpose of reaming holes, it is desirable to provide means for expanding or contracting the cutting elements of such tools in order that holes of different sizes may be reamed by changing the setting of one tool and thus avoiding the necessity of having to provide a separate tool for each size of hole to be reamed. It is also important to provide compensating means so that cutting blades, with which such reamers are equipped, may be resharpened and yet maintain the original size. Reamers of this type ordinarily comprise a body portion which is grooved for the reception of a series of cutter blades arranged around the periphery of the body. It is of first importance that the blades be retained in the slots firmly with no possibility of movement under the stresses encountered in use, otherwise a true hole will not be reamed. The combination of the two properties in a tool of adjustability for different sizes of holes, or of compensation for sharpening, and of retaining means for the cutter blades which will permit of absolutely no movement of the blades, and consequent misalignment, has made it extremely difficult to construct a satisfactory tool since the property of adjustability requires that the retaining means be removable while, at the same time, holding the blades rigidly in place during use of the tool. These difficulties have now been overcome in a new and improved reamer which combines the characteristics of adjustability with complete and secure attachment of the cutting elements to the body of the tool.

It is, accordingly, an object of the invention to provide a reamer which may be used to ream holes of different sizes and which is accurate for any size to which it may be expanded or contracted. Another object of the invention is to provide a reamer which maintains its adjustment under the stresses encountered in use. A further object of the invention is to provide a reamer which may be resharpened and yet retain its original size. Still another object of the invention is to provide a reamer combining in one tool a number of improved characteristics resulting in a tool which is more useful and accurate than any now in use. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

Figure 5:
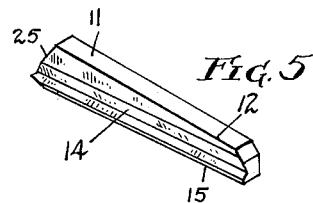
Figure 3:
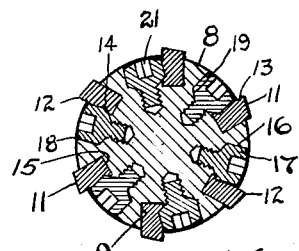
Figure 4:
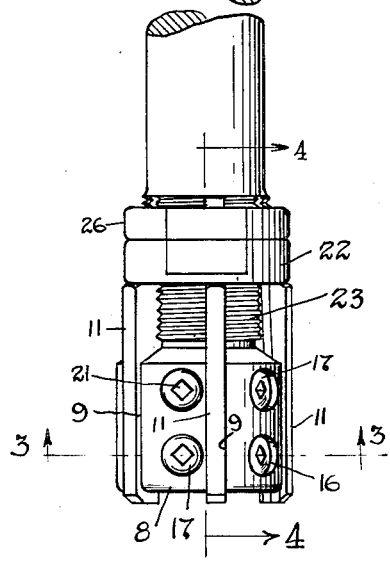
Figure 4:
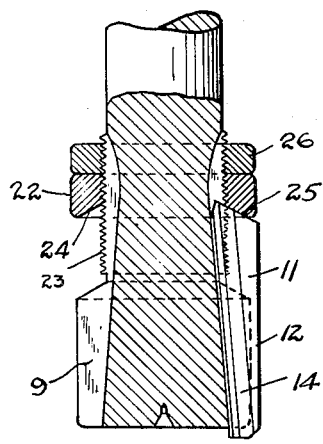
Figure 2:
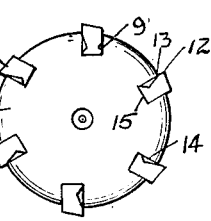

In said annexed drawing:

Fig. 1 is a vertical elevation of the improved reamer; Fig. 2 is a plan view of one end of the reamer showing the blades in place; Fig. 3 is a section taken along the line 3—3 of Fig. 1; Fig. 4 is a section taken along the line 4—4 of Fig. 1; and Fig. 5 is a perspective view of a cutter blade constituting an element of the reamer.

Referring now to Fig. 1, the reamer consists of a shaft 6 having an end 7 suitable in form for the application of turning means and a body portion 8 constituting the blade-carrying portion of the reamer. In this body is provided a plurality of slots 9 arranged around the periphery of the body and which may be varied in number, six being shown in the drawing. These slots are disposed with one face thereof approximately on a radius of the cylindrical body for a purpose later to be described. The slot is tapered, becoming deeper toward the rear. In each of these slots is placed cutter blades 11 which fit snugly into the slots and are also tapered, becoming wider toward the rear. The blades and the slots are thus mated and the cutting edges 12 of the blades will lie approximately in the surface of a cylinder concentric with the body of the tool. Since the blades fit snugly into the slots, the forward face 13 thereof carrying the cutting edge 12 corresponds with the approximately radially disposed wall of the slot so that the cutter blades have a slight positive rake, increasing their cutting efficiency.

Means must be provided to hold these blades securely in place in the slots against any force encountered in use tending to dispose the blades either outwardly or forwardly which would alter the dimensions of the tool and, consequently, of the hole being reamed. To this end, clamping grooves 14 are formed in the forward faces 13 of the blades running parallel with the bottom surface 15 of the blade and extending the full length of the blade, as may be seen to best advantage in Fig. 5. Adjacent each blade, there is provided in the body of the tool, a plurality of holes 16, narrowed and threaded at the bottom to receive screws 17. Two holes are shown for each blade in the modification described, but this number may be increased or decreased if desired, but two holes for each blade are preferred for complete and rigid fastening of the blades. The axes of these holes are disposed at a slight angle to a radius of the tool so that the center lines of the holes intersect a radial plane passing through the adjacent blade slot. The shoulder of the hole pierces the adjacent wall of the slot at a point giving access to the grooves 14. The screws 17 are provided with heads 18 having a shoulder 19 which fits into one of the grooves 14 in the blades and is held securely in engagement therewith by turning down the screw which is provided with a hole 21 in the head for the application of turning means.

Since the holes 16 are arranged at an angle with the radius of the body of the tool and run from the cylindrical surface of this body toward the adjacent blade slot, tightening of these screws brings the shoulders thereof into close engagement with the groove in the blade and holds the blade against both outward and forward movement, the pressure of the screw, due to the direction of the hole, being downward and backward. It is found that at least two screws must be provided for each blade since, otherwise, the blade will not be held firmly throughout its length and there will be a tendency for the blade to wobble and loosen.

In addition to the retaining means described above, the improved reamer is also provided with adjusting means where it is desired to increase or decrease the effective diameter or where it is desired to compensate for resharpening of the blades. This means consists of a collar 22 threaded on the screw-threaded portion 23 of the body of the tool. This collar has a beveled lower face 24 which fits against the beveled end 25 of the cutter blades. By turning down this collar, the blades will be forced forwardly and, since their width is greater toward the rear, they will also be forced outwardly as they are moved along the tapered slots 9, which become shallower toward the point. This device permits both an expansion or a contraction of the effective diameter of the reamer and also permits compensation for the reduction of the size of the tool by resharpening. A lock nut 26 is provided above the collar which serves to lock the collar in place when the correct adjustment has been attained, or other locking means, such as set screws, may be used.

The new and improved reamer herein described combines features resulting in a tool having excellent operating characteristics and of increased utility. Holes of different sizes may be reamed thereby and the tool may be accurately adjusted for each hole. At the same time, the reamer maintains its adjustment under the powerful stresses encountered in use without loosening or changing its dimensions, so that work is not spoiled by reaming an untrue or oversized hole.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

In a reamer, the combination of a substantially cylindrical body member provided with a threaded area remote from its operating end and an enlarged area adjacent its operating end, circumferentially spaced axially extending and tapering slots in said body extending deeper thereinto in said threaded area than in said enlarged area, a plurality of longitudinally tapered cutting blades respectively snugly engaged in said grooves, radially and axially removable therefrom and extending outwardly to their cutting edges which all lie approximately in the surface of a cylinder concentric with said body, the larger rear ends of said blades being tapered on their outer surfaces, a blade securing nut on the threaded portion of said body and provided with a coniform extension adapted to engage the tapered terminal portions of said blades, each of said blades provided on its forward face with a V-shaped groove extending throughout the length and adjacent and parallel to the bottom edge thereof, the enlarged portion of said body provided with a plurality of axially spaced countersunk tapped holes adjacent the forward wall of each of said grooves, the enlarged portions of said holes opening into and extending to substantially the bottom of said slots, and a plurality of screws, provided with enlarged heads having polygonal wrench receiving sockets and said heads coniform on their bottom surfaces, threadably engaged in said holes whereby said heads engage the grooved portion of said blades to force the same into engagement with the bottom and rear surfaces of said blade receiving slots.

THOMAS F. GITHENS.